Sept. 20, 1971  R. E. SCHOTT ET AL  3,605,391
HEADER HEIGHT CONTROL

Filed May 19, 1969  2 Sheets-Sheet 1

Inventors
Robert E. Schott
Ramkishan Khakki
By Kenneth Macknight
Attorney

Inventors
Robert E. Schott
Ramkishan Khatti
by Kenneth ...
Attorney

United States Patent Office 3,605,391
Patented Sept. 20, 1971

3,605,391
HEADER HEIGHT CONTROL
Robert E. Schott, New Berlin, Ind., and Ramkishan Khatti, Milwaukee, Wis., assignors to Allis-Chalmers Manufacturing Company, Milwaukee, Wis.
Filed May 19, 1969, Ser. No. 825,878
Int. Cl. A01d 67/00
U.S. Cl. 56—208
9 Claims

ABSTRACT OF THE DISCLOSURE

A combined electrical, mechanical and hydraulic mechanism for maintaining the height of a combine harvester header relative to the ground at a constant height and wherein hydraulic means are provided for controlling the acceleration and deceleration of such header as it is being moved upwardly or downwardly in response to a height signal.

---

The present invention relates generally to combines, and more particularly to a combine header and means for automatically adjusting the cutting height of the header so as to accommodate variations in ground level.

Headers for combines are very large and very heavy, sometimes being over twenty feet long and weighing several tons. Accordingly, it is apparent that shock loading of such mass can be destructive. It is therefore a principal object of this invention to provide means for automatically adjusting the height of a header without inducing shock loads.

A further object of this invention is to provide means for automatically adjusting the height of a header without inducing shock loads and wherein such means is adjustable to handle headers of different sizes and weights.

It is an object of this invention to provide a solenoid operated header height control mechanism with acceleration and deceleration control.

A further object of this invention is to provide an electrically operated hydraulic valve arrangement that controls a single acting cylinder and provides controlled acceleration and deceleration of the load on the cylinder so as to minimize shock loads.

A further object of this invention is to provide manually operated control means that electrically controls a single acting cylinder and provides a controlled acceleration and deceleration of the load on the cylinder.

A further object of this invention is to provide manually operated control means for overriding an automatic height control means and which uses the components of the automatic height control means for providing controlled acceleration and deceleration of said header when raised or lowered by said manual means.

These and other objects of the invention and advantages will become apparent as the construction and operation are more fully described and claimed, reference being made to the accompanying drawings forming a part hereof, wherein like numerals refer to like parts throughout and in which:

Figure 4:
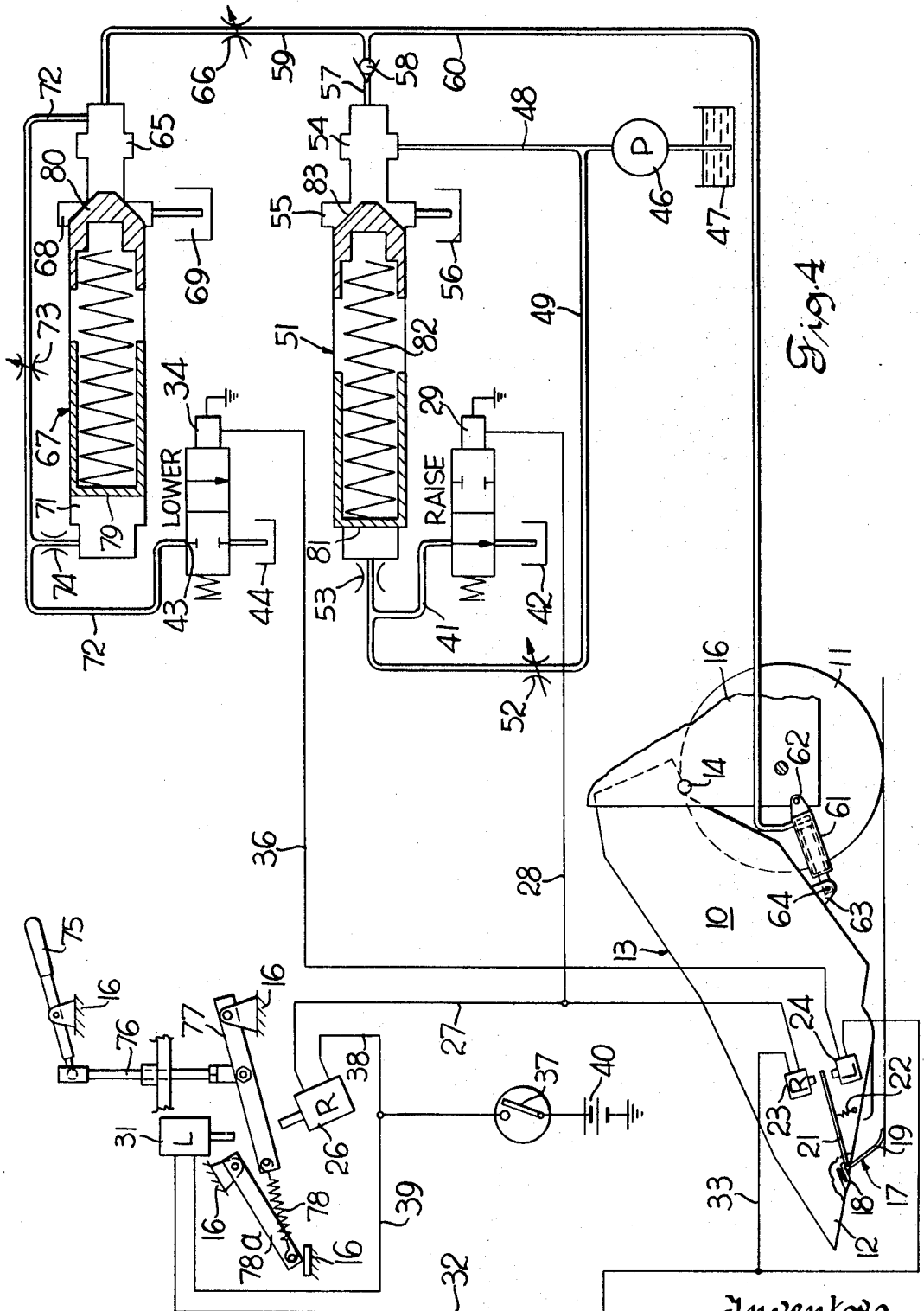
FIG. 4 is a schematic view of a header control system with a partially diagrammatic side elevation view of a portion of a combine harvester embodying the invention.

Referring to the drawings which illustrate a preferred embodiment of the invention, FIG. 4 illustrates fragmentarily the front end of a combine 10 including one of the main wheels 11 and the cutting head 12 which is positioned at the forward end of a header unit 13 pivoted at 14 on the main frame 16 of the combine 10 for pivotal movement effective to raise the cutting level of the cutting head 12. FIG. 4 shows the combine as provided with a combination electrical and hydraulic system for automatically raising and lowering the header. This system includes a bell crank lever feeler member 17 pivotally mounted on cutter bar mechanism 18 on header unit 13 and having a ground contacting arm 19 and a signal arm 21. Arm 21 is shown as being biased by spring 22 for maintaining feeler 19 in contact with the ground; however, spring 22 is not necessary as feeler member 17 will function by reason of its weight. Arm 21 is shown as being neutrally positioned between electrical contacts 23 and 24 out of contact with both. These contacts are micro switches each of which have a connection to an actuating solenoid. Switch 23 is connected to manual switch 26 by connector 27. Connector 28 extends from connector 27 to solenoid valve 29.

Switch 24 is connected to manual switch 31 by connector 32. Connector 33 extends from connector 32 to switch 23. Switch 24 is also connected to solenoid valve 34 by line 36.

Switch 37 is connected to manual switch 26 by connector 38 and to manual switch 31 by connector 39, respectively. Reference number 40 is applied to an electric power source connected to switch 37. Solenoid 29 is so constructed that its natural bias is to maintain a passage 41 open to sump 42. The natural bias of solenoid 34 is to keep passage 43 blocked from sump 44.

A pump 46 is provided with a source of hydraulic fluid 47. The delivery end of pump 46 is connected to line 48 which is in turn connected to line 49 connected to the rear end of poppet valve 51 through an adjustable restrictor 52 and a fixed restrictor 53 to provide a pilot pressure supply. Line 48 connects to chamber 54 at the forward end of poppet valve 51 to there provide pressurized fluid from pump 46. Chamber 54 is shown as being in connection with chamber 55 because the right hand end of poppet valve 51 is not blocking chamber 54 from chamber 55 which is connected to sump 56. Chamber 54 has another outlet 57 connected to check valve 58 which has an outlet in lines 59 and 60. Line 60 connects to hydraulic ram 61 which is pivotally mounted at one end on pin 62 carried by frame 16. The other end of ram 61 is pivotally connected to bracket 63 by means of pin 64. Bracket 63 is attached to header unit 13.

Line 59 is connected to chamber 65 through an adjustable restrictor 66 at the forward end of poppet valve 67. As shown in FIG. 4, chamber 65 is blocked from chamber 68 which connects with sump 69. Chamber 65 is connected with chamber 71 at the rear end of poppet valve 67 by means of line 72 to provide same with a pilot pressure fluid supply.

A pair of restrictors 73 and 74 are interposed in line 72. Restrictor valve 73 is of the manually adjustable type while restrictor 74 is of the fixed restrictor type. Line 72 also connects with passage 43 which is normally blocked from communicating with sump 44 by solenoid valve 34.

Manual means are also provided for actuating hydraulic cylinder 61 for raising or lowering header unit 13. This means includes operating lever 75 which is pivotally mounted at a mid-portion thereof on frame 16 for movement in a vertical plane. The left hand end of operating lever 75 is pivotally connected to one end of vertical link 76 which is pivotally connected at its other end to a mid portion of lever 77. The right hand end of lever 77 is pivotally connected to frame 16 and the left hand end of lever 77 is connected to one end of and biased by spring 78 to the position shown in FIG. 4 approximately midway between switches 26 and 31. The other end of spring 78 is connected to one end of link 78A which is pivotally connected at the other end thereof to frame 16. Accordingly, a downward push on the handle of lever 75 will cause a contact between link 77 and switch 31, and if switch 24 is closed by arm 21, solenoid valve 34 will be actuated resulting in a lowering of header 13. A release of the handle on lever 75 will cause lever 77 to move into the neutral position and an inactivation of solenoid 34 as is shown in FIG. 4. A raising of the handle on lever 75 will cause lever 77 to contact switch 26 resulting in an activation of solenoid 29 and a raising of header 13.

To change from manual control to automatic control, the handle 75 is pushed downwardly. Spring 78 goes over center and holds handle 75 in down or detent position, causing contact between link 77 and switch 31. Now the system will be in automatic mode and the sensing mechanism will take over.

Referring to FIG. 4, the various elements are shown in their neutral position. In other words, the combine harvester 10 would continue on its course with the header remaining in the position shown. Pump 46 obtaining fluid from sump 47 delivers pressurized fluid to lines 48 and 49. The fluid entering line 48 passes through chamber 54 into chamber 55 and returns to sump 56. The fluid entering line 49 passes through adjustable restrictor valve 52 and returns to sump 42 through line 41. Pressurized fluid in lines 59 and 60 which pressure fluid supports header 13 is trapped from returning to valve 51 by ball check valve 58 and the pressure build-up in valve 67 is such that the pressure fluid has no path for returning to sump. The pressure fluid at the left hand end of valve 67 is blocked from returning to sump 34 by solenoid valve 34. The pressure fluid at the left end of valve 67 exerts a pressure against the piston 79 of valve 67 forcing poppet valve head 80 against its seat blocking chamber 68 and its return to sump 69 from chamber 65 and thereby maintaining pressure in lines 59 and 60 for supporting header 13 through hydraulic cylinder 61.

Referring to FIG. 4, assuming lever 75 has been positioned for automatic operation and assume the land is dropping away from feeler 19, this would cause feeler 19 to pivot clockwise resulting in a contact between arm 21 and switch 24, causing an actuation of solenoid valve 34 to open the block between passage 43 and sump 44. Pressurized fluid will now pass through adjustable orifice 73 and fixed orifice 74 through passage 43 and into sump 44 thus gradually reducing the pressure being exerted on piston 79 which in turn gradually reduces the force on spring loaded poppet head 80 and gradually the pressure in line 59 will overcome and move poppet head 80 away from its seat, permitting the pressure fluid to return to sump 69. The fluid from cylinder 61 flows to sump 69 through line 60, line 59, restrictor 66, chamber 65 and chamber 68 until header 13 has reached its desired height above the ground. At this point, feeler member 21 would have returned to its neutral position shown in FIG. 4 releasing solenoid 34 so that it would return it to its position of neutral bias wherein the pressurized fluid in chamber 71 and chamber 65 are blocked from returning to sump 44 and 69, respectively, thus maintaining header 13 in a position of desired height.

It should be noted that various reference numerals have been applied to sumps such as 42, 44, 47, 56 and 69. Actually, one reference numeral for all the sumps could have been used but it is believed that separate reference numerals makes the diagrammatic showing of FIG. 4 easier to understand.

Referring again to FIG. 4, assume the land slopes upwardly ahead of feeler 19 and control lever 75 is positioned for automatic operation. This would cause feeler 19 to pivot counterclockwise resulting in a contact between arm 21 and switch 23 causing an actuation of solenoid valve 29 to block line 41 from sump 42. In turn this would cause the pilot pressure at the rear of poppet assembly 51 to start building up and forcing piston 81 to gradually move toward the right which in turn gradually compresses spring 82 forcing poppet valve head 83 against its seat and thereby blocking the pressure fluid in chamber 54 from passing into chamber 55 and thus to sump 56. As the pressure at the left hand end of valve 51 builds up so does the pressure in chamber 54. When pressure in chamber 54 reaches a height sufficient to overcome valve 58, then pressure fluid from chamber 54 enters line 59 and 60 gradually raising header 13 about its pivot 14 by supplying pressurized fluid to hydraulic cylinder 61.

The pressure fluid entering line 59 pressurizes the left hand end of valve 67 to maintain valve head 80 seated and thereby preventing movement of fluid from chamber 65 to chamber 68 and thus to sump 69. When cylinder 61 has raised header unit 13 the desired amount, i.e., until feeler 21 is in the neutral position shown in FIG. 4 and contact with switch 23 had been terminated; such termination causes solenoid 29 to return to its unenergized position opening tube 41 to sump 42 which relieves the pressure on the rear end of piston 81 and in turn the pressure on spring 82 and poppet head 83 thereby permitting poppet head 83 to move away from its seat so that chamber 54 can exhaust into chamber 55 and sump 56. Poppet valve 67 and check valve 58 prevent the pressurized fluid in lines 59 and 60 from returning to sump and thereby maintain header unit 13 at its desired height. Pump flow now goes through chamber 54 to chamber 55 and to sump 56.

Figure 1:
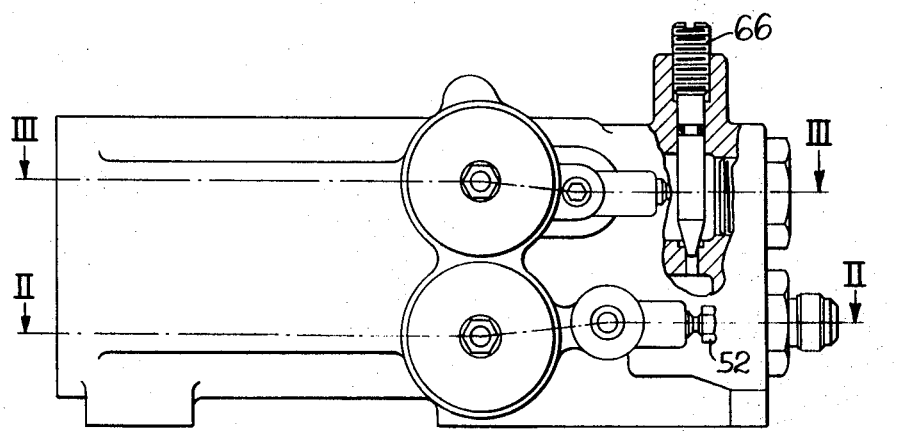
FIG. 1 is a plan view of a raising and lowering poppet valve assembly partially in section.

Referring to FIGS. 1 and 4, adjustable restrictor 66 is the adjustable needle valve which makes it possible to substitute various sized headers. By adjusting needle valve 66 the various sizes of headers can be compensated for. Further adjustable restrictor 66 provides means for controlling rate of drop of the header mass resulting in smoother and controlled lowering of the header.

Figure 2:
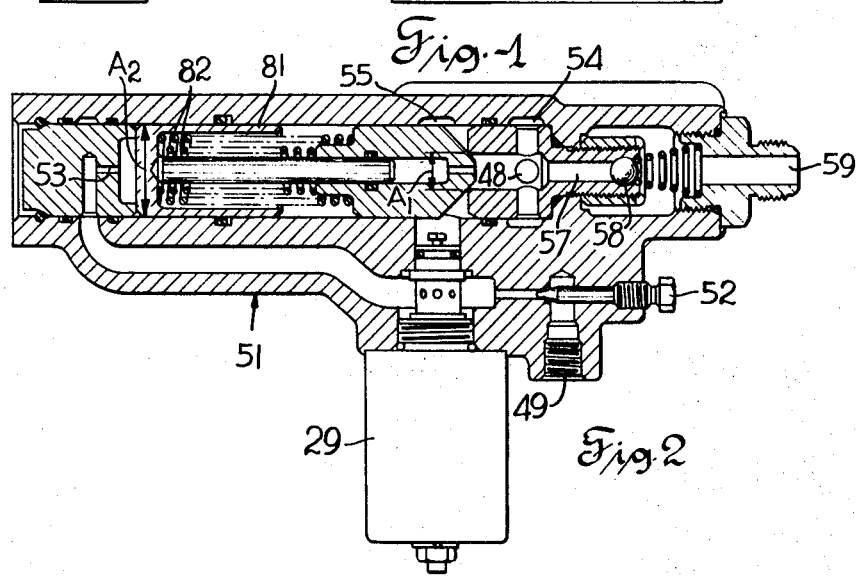
FIG. 2 is a view taken on line II—II of FIG. 1.

Referring to FIGS. 2 and 4, adjustable restrictor or needle valve 52 and fixed restrictor 53 provide controlled acceleration of the header mass at the start of raise cycle. Fixed restrictor 53 provides controlled deceleration at the end of the raise cycle when system goes into neutral mode from raise mode.

Figure 3:
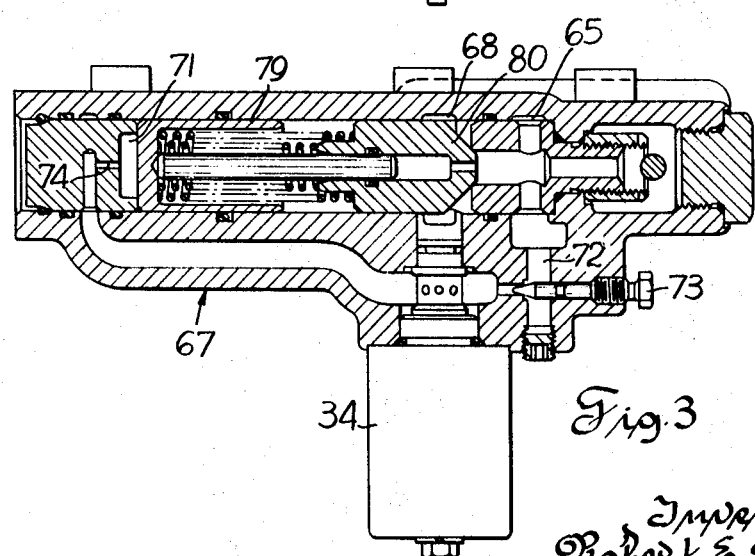
FIG. 3 is a view taken on line III—III of FIG. 1.

Further referring to FIGS. 3 and 4, fixed restrictor 74 provides a controlled acceleration at the start of the lower cycle. Whereas variable restrictor or needle valve 73 and fixed restrictor 74 provide controlled deceleration at the end of the lower cycle when system goes from lower mode to the neutral mode.

Thus with proper adjustment of variable restrictors 73 and 52, the desired acceleration and deceleration of the header mass is accomplished. This results in smooth operation by eliminating shock loads.

Reiterating the sequence of operations, if the header cutting height gets lower than the present level shown in FIG. 4, sensing member 21 operates switch 23 and solenoid valve 29 is energized. Pressurized fluid coming through restrictors 52 and 53 actuates piston 81 to move toward the right compressing spring 82 gradually increasing the force on poppet head 83. Increased force on the poppet head increases its pressure setting. As soon as pressure in chamber 54 exceeds pressure in lines 59 and 60 flow goes to ram 61 through check valve 58. Ram 61 extends and header unit 13 is raised. As header raises and attains its present level, sensor 17 assumes its neutral position de-energizing solenoid valve 29.

Acceleration of the header is changed by adjusting the size of orifice 52. Orifice gets smaller as needle valve is turned in and acceleration of header decreases. Opposite is true when needle valve is turned out.

Pressure setting of poppet valve head 83 increases according to the following pressure-time equation when solenoid valve 29 is energized to raise:

$$\frac{dP}{dt} = \frac{KC_d}{A_1 A_2}(a_1 + a_2)\left(1 - \frac{A_1}{A_2}\right)^{1/2}\left(\frac{2P}{p}\right)^{1/2}$$

where,

P = controlled pressure, p.s.i.
$a_2$ = area of the restrictor 53, in.$^2$
$t$ = time, sec.

$A_1$ = projected poppet area, in.$^2$
$A_2$ = piston cross sectional area, in.$^2$
$p$ = mass density of fluid, #-sec.$^2$/in.$^4$
$K$ = spring constant
$C_d$ = orifice constant
$a_1$ = area of the restrictor 52, in.$^2$ Referring to FIG. 2, controlled pressure is the pressure at 48. Projected area $A_1$ is as shown. Piston cross sectional area $A_2$ is a shown. $K$ is the spring constant of springs 82.

The embodiments of the invention in which an exclusive property or privilege is claimed is defined as follows:

1. Apparatus for automatically maintaining a constant header height for a pivotally mounted combine header unit actuated by hydraulically operated ram means, comprising ground variation feeler means carried by said header, control means responsive to said feeler means for operatively connecting and disconnecting a hydraulic pump with said hydraulic ram means, said control means having a raising position wherein pressure fluid is introduced into said ram means from said pump, a neutral position wherein the flow of fluid from said pump freely circulates back to a sump and the fluid previously introduced into the ram means is locked therein, and a lowering position wherein the fluid locked within the ram means is communicated to sump and the header lowers under its own weight, said control means including valve means for controlling the rate of pressure build-up in said ram means and valve means for controlling the rate of pressure decrease in said ram means for eliminating shock loading, said valve means for controlling the pressure build-up in said ram means includes a first poppet valve provided with a pilot pressure source for gradually building up the pressure on said ram means during the raising operation and controlled pressure decrease at the end of the raising, and said valve means for controlling the pressure decrease in said ram means includes a second poppet valve provided with a pilot pressure source operatively connected with said pressure fluid for gradually decreasing the pressure on said ram means during the lowering operation and controlled pressure increase at end of the lowering.

2. The combination of claim 1 and wherein said feeler means is positioned adjacent switches for actuating same to control said valve means.

3. The combination of claim 2 and wherein a solenoid valve is provided for each poppet valve and said solenoid valves are actuated by said switches for controlling said valve means.

4. The combination of claim 3 and wherein said first poppet valve in the raising position gradually communicates the pump with said ram means and blocks the pilot supply from returning to sump while said second poppet valve blocks the pilot supply thereof from returning to sump for maintaining communication between pump and ram means.

5. The combination of claim 4 and wherein said second poppet valve in the lowering position gradually communicates the pilot supply thereof with said sump to move said lowering poppet valve in a position to communicate the trapped pressure fluid in said ram means with said sump while said first poppet valve pilot supply means is communicated to sump and said pump is also communicated to sump.

6. The combination of claim 5 and wherein said second poppet valve in the neutral position is provided with a pilot supply of pressure fluid from said ram means and the solenoid valve thereof blocks the return to sump of such fluid, while the pilot supply of pressure fluid for said first poppet valve is diverted to sump by the solenoid valve thereof thus actuating the raising poppet valve to communicate said pump with said sump, and a valve positioned between said poppet valves for trapping pressure fluid in said ram means for maintaining said header stationary.

7. The combination of claim 1 and including manual means for actuating said poppet valves for raising or lowering said header.

8. The combination of claim 5 and wherein said valve means for controlling the rate of pressure decrease and increase comprises a needle valve and a fixed restrictor in the pilot pressure lines for each of said poppet valves.

9. The combination of claim 7 and wherein said manual means is actuable for raising said header regardless of the position of said feeler means and said manual means is actuable for lowering said header only when said feeler means is in lowering position.

References Cited
UNITED STATES PATENTS

| | | | |
|---|---|---|---|
| 3,196,599 | 7/1965 | Meiners et al. | 56—11 |
| 2,473,655 | 6/1949 | Lohn | 56—214 |
| 3,088,264 | 5/1963 | Sallee | 56—208 |
| 3,309,852 | 3/1967 | Allen | 56—208 |
| 3,312,048 | 4/1967 | Annat et al. | 56—214 |
| 3,498,037 | 3/1970 | Hobson et al. | 56—210 |

ANTONIO F. GUIDA, Primary Examiner

U.S. Cl. X.R.

56—Dig. 15